United States Patent [19]

Ostrowski et al.

[11] 4,344,381
[45] Aug. 17, 1982

[54] APPARATUS FOR CONTINUOUSLY ELECTROSTATICALLY COATING AN ELONGATED OBJECT

[75] Inventors: Arthur E. Ostrowski, Valparaiso, Ind.; Joseph M. Polich, Chicago, Ill.

[73] Assignee: Allied Tube & Conduit Corporation, Harvey, Ill.

[21] Appl. No.: 220,710

[22] Filed: Dec. 29, 1980

[51] Int. Cl.³ .............................................. B05B 5/02
[52] U.S. Cl. .................................. 118/626; 118/629; 118/630; 118/634; 427/32
[58] Field of Search ............... 118/634, 626, 629, 630; 427/32

[56] References Cited

U.S. PATENT DOCUMENTS

| | | | |
|---|---|---|---|
| 1,855,869 | 4/1932 | Pugh | 118/634 |
| 2,247,963 | 7/1941 | Ransburg et al. | 118/635 |
| 2,730,460 | 1/1956 | Ransburg et al. | 118/634 |
| 2,764,508 | 9/1956 | Feick | 118/634 |
| 3,155,539 | 11/1964 | Juvinall | 118/11 |
| 3,396,699 | 8/1968 | Beebe et al. | 118/634 |
| 3,598,626 | 8/1971 | Probst et al. | 427/32 |
| 3,870,233 | 3/1975 | Wilhelm et al. | 239/15 |
| 3,929,286 | 12/1975 | Hastings et al. | 239/3 |

*Primary Examiner*—Ralph S. Kendall
*Attorney, Agent, or Firm*—Fitch, Even, Tabin, Flannery & Welsh

[57] ABSTRACT

Apparatus for electrostatically coating an elongated object of indefinite length which is aligned with the straight line path of the elongated object in a continuous manufacturing and finishing process. Electrostatic applicators are mounted to direct the coating into a substantially closed chamber at a portion of the elongated object passing therethrough. To substantially eliminate the explosive hazard occasioned by the use of an organic solvent-based coating material in the presence of electrical equipment, a combustibly inert atmosphere is maintained in the chamber and in an exhaust system leading therefrom. To maintain the electrostatic field, the coating chamber and associated coating equipment must be electrically isolated from ground.

13 Claims, 8 Drawing Figures

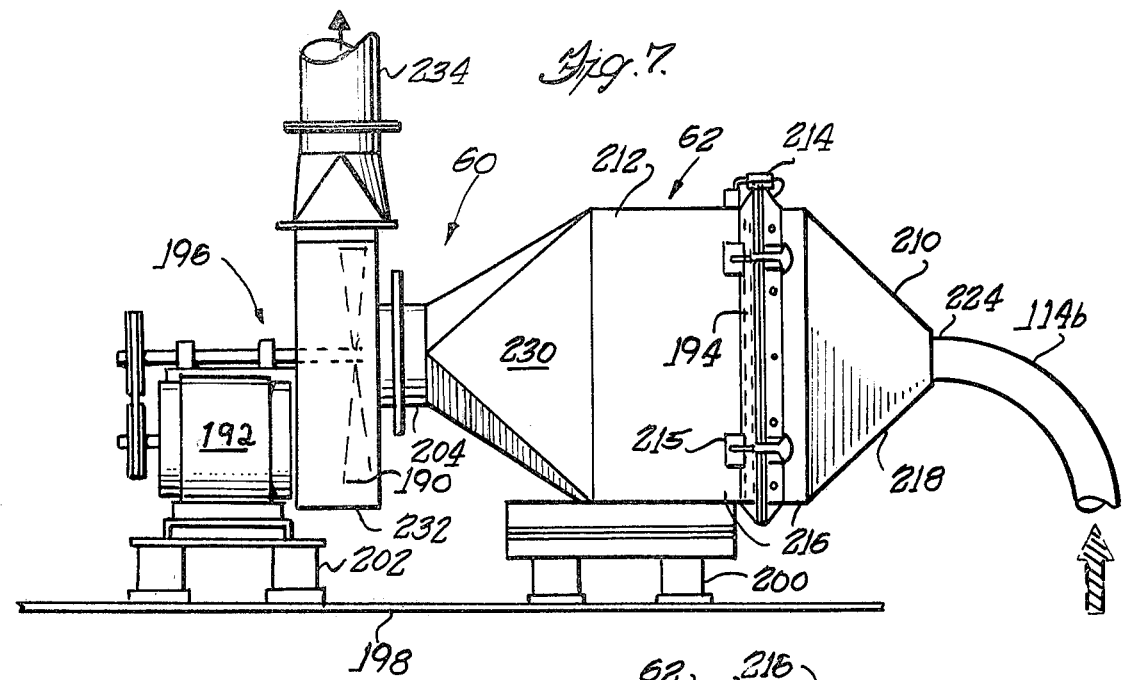
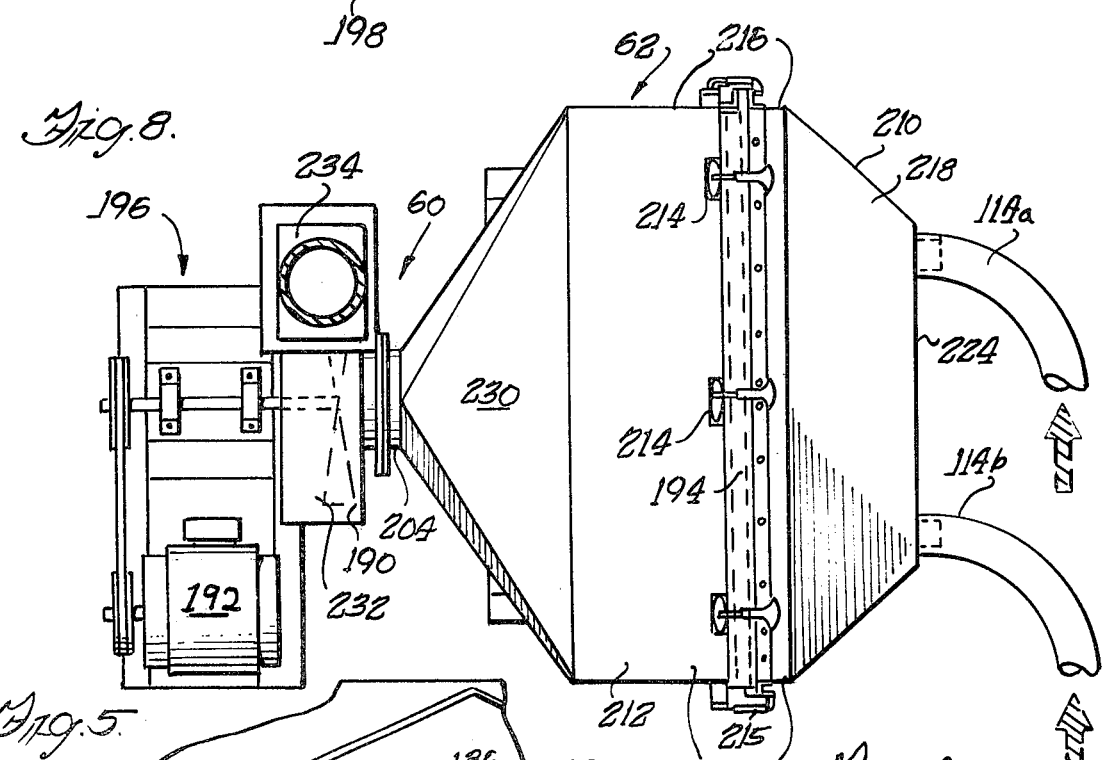
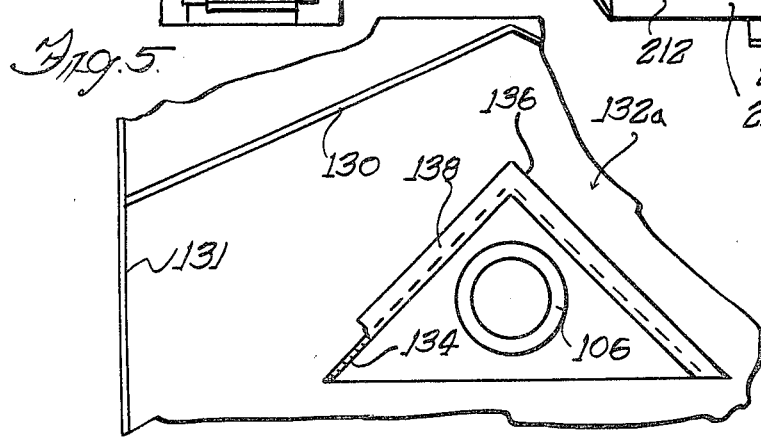
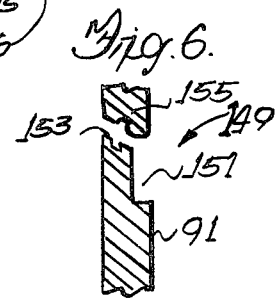

APPARATUS FOR CONTINUOUSLY ELECTROSTATICALLY COATING AN ELONGATED OBJECT

BACKGROUND OF THE INVENTION

The present invention relates to electrostatic coating of liquid materials and more particularly to apparatus to electrostatically coat an elongated object of indefinite length.

Electrostatic spray coating has proven to be an effective method of coating a wide variety of articles. The attraction between the charged coating particles and the oppositely charged object(s) reduces overspray and thus saves coating material. The greater attraction for charged particles of portions of the surface of the object with the least amount of coating, tends to even out the application and provide a more uniform coating upon the object.

The airborne solvents, particulates or aerosols resulting from electrostatic coating with a variety of organic solvent-based paints or liquid coatings may present a toxic hazard to workers or to the greater environment and should be properly disposed of. A particular hazard of electrostatic coating with a solvent-based coating material is the possibility of explosion and/or fire. To provide a sufficient charge to the coating particles which are to be attracted to a grounded object, the electrostatic coating applicators should be charged with upward of 60,000 volts. With such voltages, arcing is an ever present likelihood. The explosive hazard occasioned by volatile particulates and organic solvents in the presence of electrical arcing or sparking has made it necessary to provide high exhaust rates to maintain a safe condition for electrostatic spraying of solvent-based coatings. The high exhaust rate of heated or cooled plant air adds to the energy expenditure of electrostatic coating.

Various solutions have been proposed and utilized to overcome inherent safety factors. To protect workers from airborne coating particles and to comply with various governmental safety regulations, electrostatic coating is commonly carried on in spraying booths or chambers wherein coating-laden air is directed away from the worker, filtered and exhausted.

Liquid coating materials may be highly conductive and may form a natural path to ground when they coat the inside of a spray chamber. To appropriately insulate a coating chamber, it may be necessary that the entire spray coating system be isolated from ground as described in U.S. Pat. No. 3,929,286.

Due to the high explosive potential of organic solvent-based electrostatic coating, alternatives such as water-based and powdered coating materials are more widely used. However, these alternatives have their own associated application problems and are not always the most suitable. Deposits of powder coating may quickly build up in a coating chamber. The use of highly conductive water-based coatings increases the inherent shock hazards. Furthermore, each coating has its own characteristics making each coating particularly suitable for specific applications. Accordingly, it is desirable that organic solvent-based coatings be included among the available coatings which may be efficiently and safely applied electrostatically.

The coating of elongated items such as wire, pipe, conduit or strips present particular problems. The length of such items necessitates that such items be passed through and extend from a chamber wherein the item is continuously coated. Because an elongated item must pass through the chamber, it is problematical to provide a sufficiently enclosed chamber to prevent contamination of the surrounding atmosphere. Furthermore, as the object extends from the spray coating chamber, the elongated object must not be highly charged so as to create an electrical shock hazard to workers. Above-mentioned U.S. Pat. No. 3,396,669 (wire) and U.S. Pat. No. 3,598,626 (pipe) describe systems in which elongated objects are passed through coating chambers and continuously electrostatically coated with powder.

It is an object of the present invention to provide apparatus whereby elongated objects of indefinite length may be continuously electrostatically coated with various liquid coatings. It is a further object to operate such apparatus in a manner in which the danger of electrical shock to users is minimized. It is a still further object to provide an electrostatic coating system in which organic solvent-based coatings may be used and in which the danger of explosion is substantially eliminated. Still further objects of the invention are to prevent overspray of coating material in the chamber from dripping onto the elongated object and to recover the overspray for reuse.

SUMMARY OF THE INVENTION

The above objects are achieved in the present invention by passing an elongated object through a substantially closed coating chamber wherein a combustibly inert atmosphere is maintained and wherein coating-laden carrier gas is withdrawn through an associated exhaust system. The coating chamber and associated coating equipment is electrically isolated from ground, from the exhaust means, and from the spray guns.

Baffle means are provided in the coating chamber to direct drops of overspray coating to the lower end of the chamber without dripping on the elongated object, and to direct overspray coating, which accumulates at the bottom of the chamber, back to the reservoir of coating.

IN THE DRAWINGS

FIG. 5 is an enlarged partial elevation view of the interior of the application chamber of FIG. 3 illustrating the overhead baffle and the drip shield over the conduit entrance port.

FIG. 6 is an enlarged cross sectional view of the opening in an insulating panel through which the nozzle of an electrostatic spray gun is inserted.

FIG. 7 is a side elevation view of the exhaust apparatus of FIG. 1.

FIG. 8 is a plan view of the exhaust apparatus shown in FIG. 7.

DETAILED DESCRIPTION OF THE PREFERRED EMBODIMENTS

Figure 1:
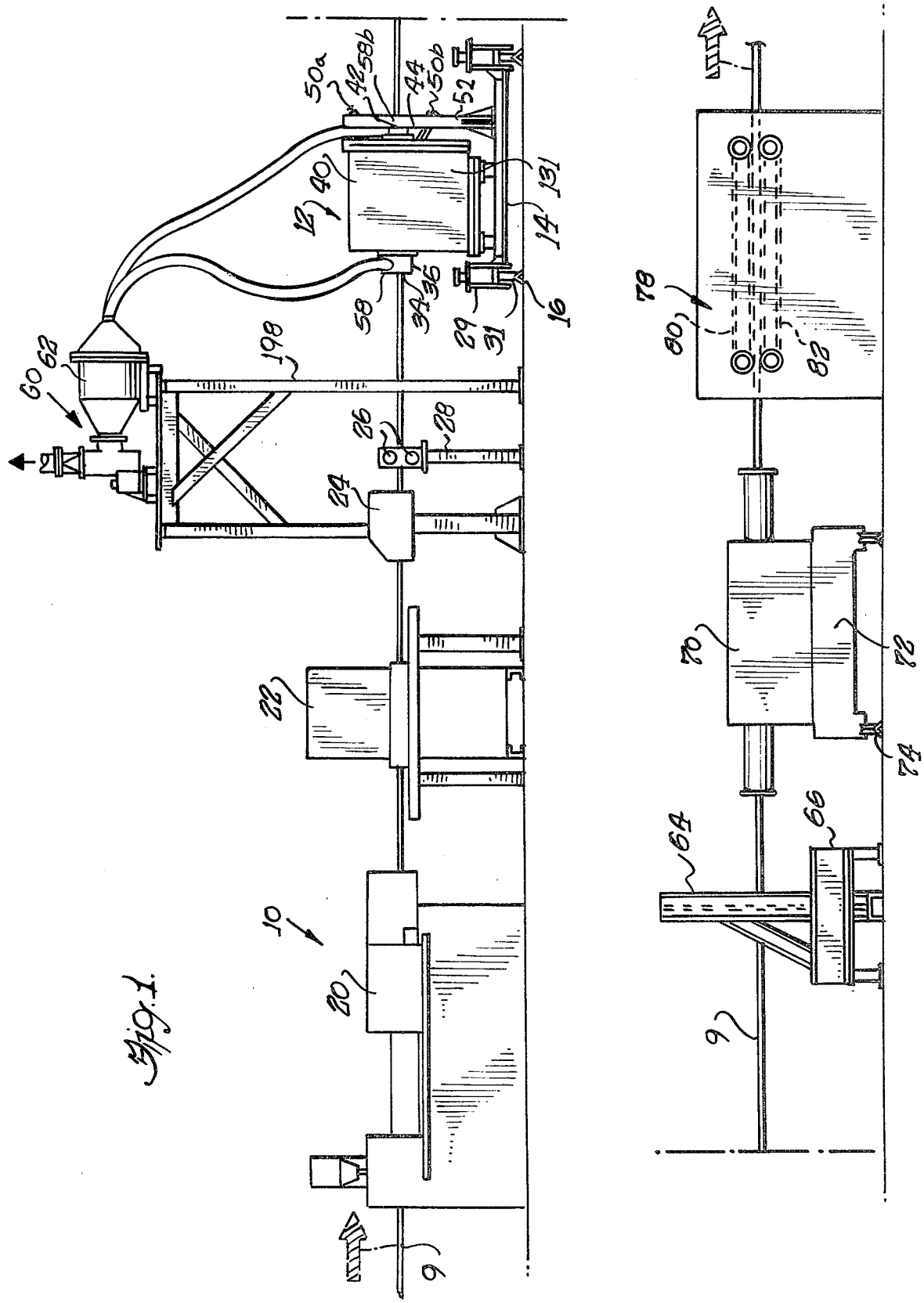
FIG. 1 is an elevation view of apparatus of a tube finishing line, including a coating application chamber wherein tubular product is electrostatically coated.
Figure 2:
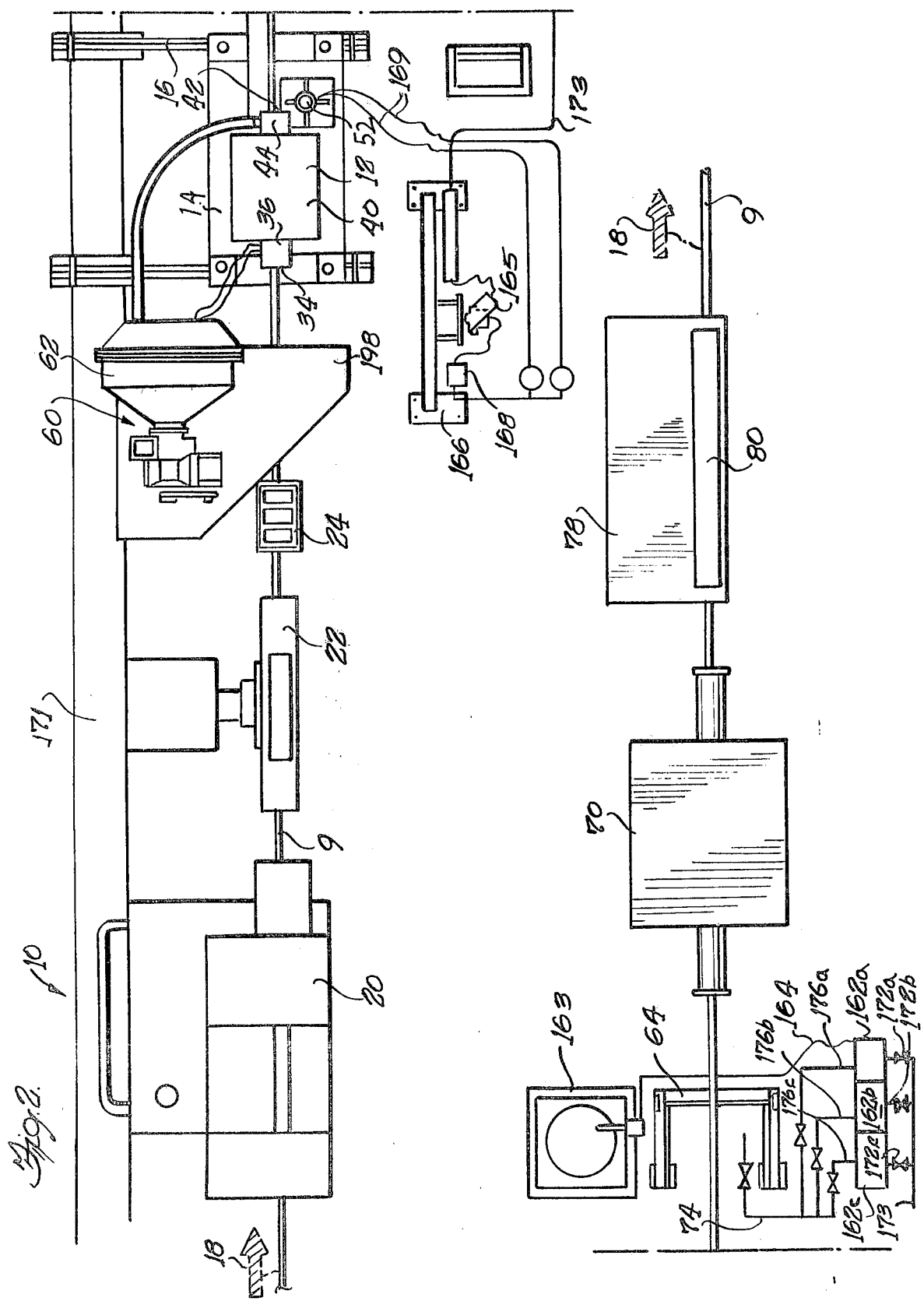
FIG. 2 is a plan view of the tube finishing line of FIG. 1.

Various applications may require that an elongated item, such as tubing 9, be painted or otherwise coated with particular paints or coatings. Provided herein is apparatus which may be used to coat or paint continuously formed tubing 9 moving in a straight-line path. While the invention is described herein in terms of apparatus used to coat continuously formed tubing, the invention encompasses apparatus to electrostatically coat various types of elongated objects including the products of tubemills, pipemills, rollformers, extruders, wiremills, rodmills, stripmills etc. In addition to continuously formed objects, apparatus encompassed by the invention may be used to coat objects such as tube or pipe sections joined end to end. Coiled tubing, wire, etc., may be uncoiled, coated and recoiled. Illustrated in FIGS. 1 and 2 is an arrangement of apparatus in a tube finishing line 10, including the electrostatic coating application chamber 12 of the present invention, which may be used to apply various coatings to metal tubing 9. It is to be understood that the arrangement of apparatus is exemplary of a tube finishing line and that various pieces of apparatus may be changed, added or substracted, according to coating requirements, and that all pieces of apparatus in the line 10 need not be used in processing tubing for different purposes. Indeed, as illustrated, the coating chamber 12 is mounted on a platform 14 which rolls along a transverse track 16 so that the chamber 12 may be rolled into alignment with the straight-line path of the tube 9 only when coating is to be electrostatically applied to the tube.

Beginning at the left of FIGS. 1 and 2, the tube 9, which is electrically grounded through contact with the tube forming rolls (not shown), is passed in the direction of the arrows 18 through a chromate coating unit 20. The tube 9 is thereafter passed through an induction heating unit 22 to heat the tube prior to electrostatic coating. A drying unit 24 removes any moisture which may be on the heated tube 9 prior to coating. The tube 9 is supported by a pair of guidance wheels 26 mounted on a support post 28. When tube 9 is to be electrostatically coated, the platform 14 is moved into position along the transverse track 16 so that the coating chamber 12 is aligned in the path of the tube, and brakes 29 are applied to the platform wheels 31 to prevent accidental movement of the aligned platform. The tube 9 enters an entrance port 34 of an inlet subchamber 36, passes through the main portion 40 of the coating chamber 12 and exits through an exit port 42 of an exit subchamber 44.

A pair of electrostatic coating applicators or spray guns 50a and 50b (FIG. 3) are supported from a post 52 or the main mounting plate of the chamber and mounted so as to direct a spray of coating material at a portion of the tube within the chamber. The guns 50 are mounted so that only the nozzles extend through nozzle openings 54a and 54b (FIG. 3) into the interior of the chamber 12. This prevents the paint from coating the gun barrel which could decrease electrostatic efficiency.

Figure 3:
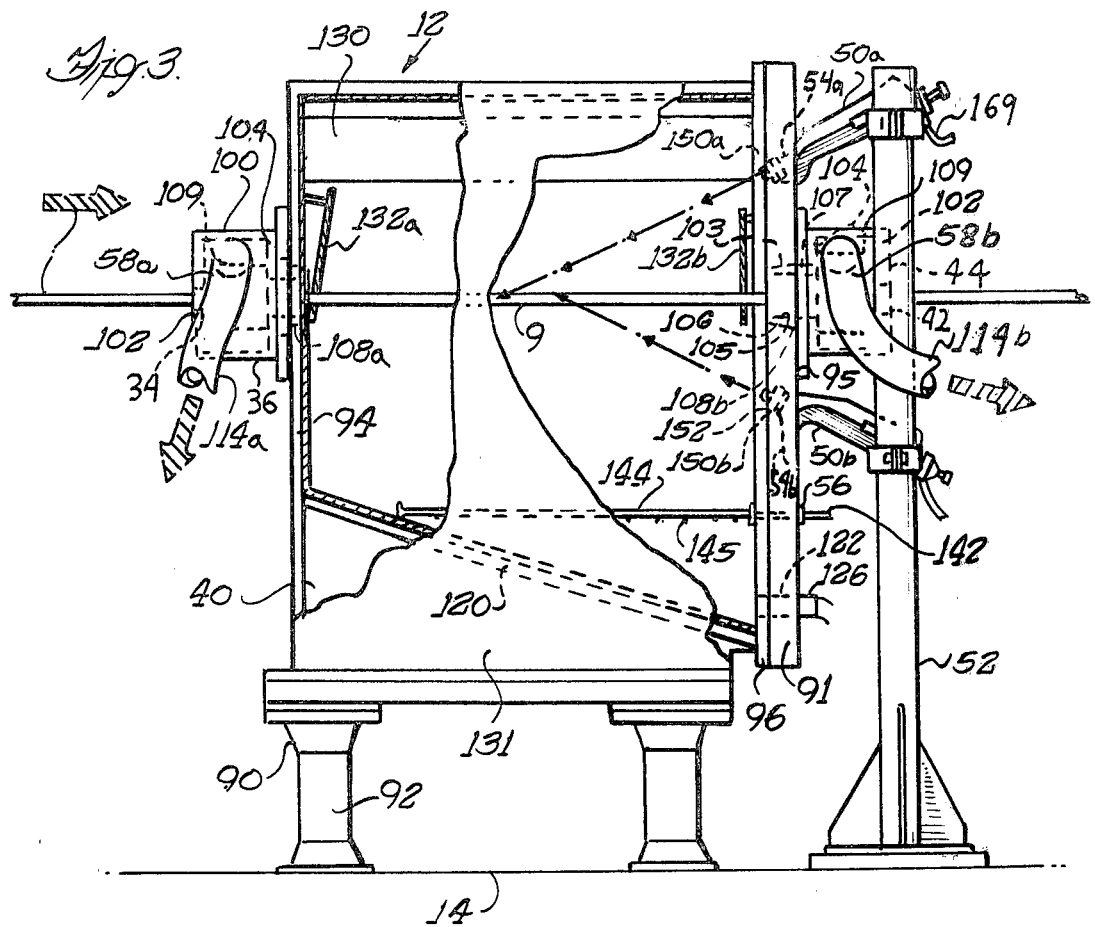
FIG. 3 is a side elevation view, partially cut away, of the spray coating chamber of FIG. 1.

An atmosphere of combustibly inert gas, such as nitrogen, is supplied to the chamber 12 through a gas port 56 (FIG. 3). Paint laden gas exits the chamber 12 through vent ports 58a and 58b in the inlet subchamber 36 and outlet subchamber 44, respectively, leading to exhaust apparatus 60. The exhaust gas is cleaned in a filter chamber 62 prior to venting of the gas.

Beyond the chamber 12, a fold-up guard 64 may be used to guard against tube misalignment. A curing chamber 70 which is shown in FIG. 1 is mounted on a platform 72 which may be rolled on transverse rails 74 into alignment with the path of the tube 9 when specific coatings, such as heat-curable coating material, are applied.

The tubing 9, which is pushed by the tube forming rolls and sizing rolls along its straight-line path, is pulled along by a belt drive 78 having an upper continuous belt 80 and a lower continuous belt 82 which move the tubing therebetween. To allow sufficient time for drying or curing of the coated tube 9 without marring of the finish, the span of tubing between the guidance wheels 26 and the belt drive 78 is unsupported.

The speed which the tube forming apparatus moves the tube 9 along its path of travel may vary as, for example, when the production of tube from strip metal is slowed as each successive reel of strip metal is welded to the next. Varying speed of the tube 9 as well as vibrations inherent in the tube forming and finishing line may cause the tube to wobble, particularly in the long span between the guidance wheels 26 and the belt drive 78. The pulling of the belt drive 78 holds the tube 9 in tension to maintain the span of tube in its straight-line path.

To facilitate understanding of the present invention, the electrostatic coating apparatus will now be described in greater detail.

Figure 4:
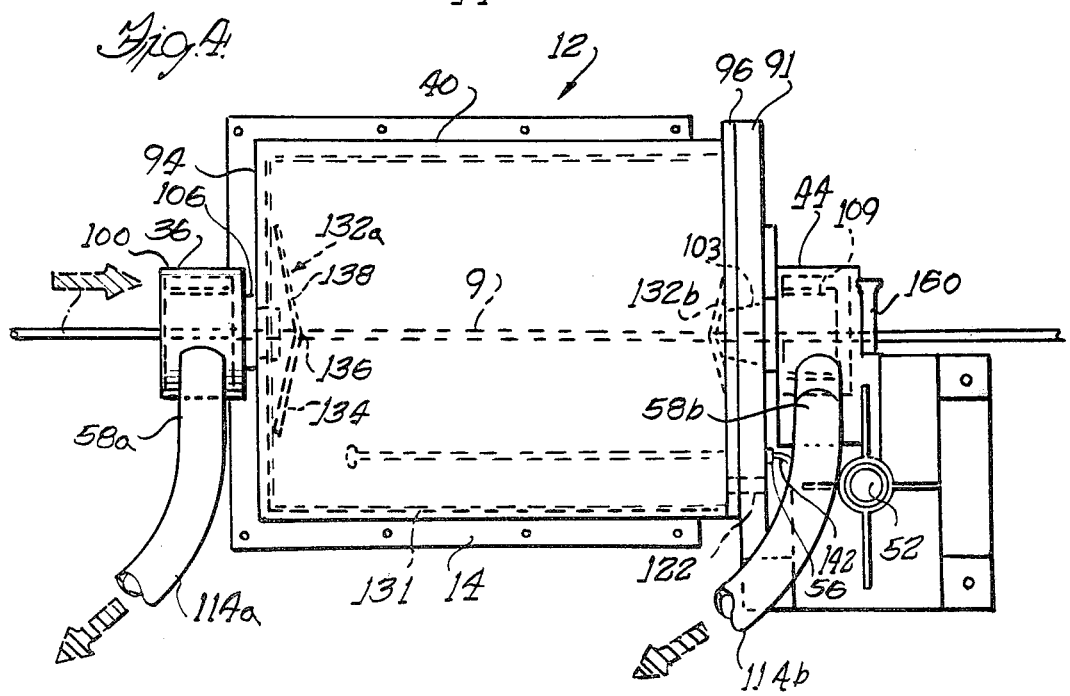
FIG. 4 is a plan view of the coating application chamber shown in FIG. 3.

The coating application chamber 12, as illustrated in FIGS. 3 and 4, is generally in the shape of a rectangular box, although other shapes may be appropriate. The chamber 12 is elevated above the movable platform 14 on which it is mounted by four standoffs 90, each standoff having an insulating section 92 made of an insulating polymer to electrically isolate coating chamber 12 from ground so that electrostatic potential is not lost. The walls of the chamber 12 and, as much as is practical, other parts of the chamber are also formed of insulating material, such as polypropylene on coated fiberglass, to electrically isolate the chamber. The back wall 96 of the chamber 12, through which the spray guns 50 are inserted, includes an additional layer 91 of thick electrical insulating material to aid in supporting the guns.

The inlet and outlet subchambers 36 and 44 are provided so that air, which enters the inlet and outlet ports 34 and 42 through which the tube 9 travels, may be exhausted from the subchambers along with coating-laden carrier gas from the chamber 12 before any significant amount of air enters the main portion 40 of the coating chamber. The inlet subchamber 36 and exit subchamber 44 are mounted in alignment with the path of the tube from the front wall 94 and back wall 96 by mounting clips 95 which are secured by bolts to the walls. The subchambers 36 and 44 are identical for simplification of construction. Each subchamber 36 and 44 is comprised of a large cylindrical sidewall 100 with an outside annular wall 102 which includes the inlet or outlet port 34 or 42 and an inside wall 104 which faces the front wall 94 or back wall 96 of the chamber 12 when the subchambers are mounted therefrom.

A cylindrical flange 109 extends inward of each inside wall 104 of each subchamber 36 and 44 and is spaced from the outside wall 102 of the subchamber. The flange 109 of the outlet subchamber 44, while allowing air to flow around its end to the exhaust port 58, insures that the air flow around the freshly coated tube 9 is uniform and that the freshly applied coating is not disturbed by the current of air flowing to the exhaust port extending from the sidewall 100.

Collars 106, each having a generally cylindrical passageway 105 therethrough, are located in openings 107 in the inside walls 104 of each subchamber 36 or 44 and in openings 108a and 108b in the front wall 94 and back wall 96 of the main portion 40 of the chamber 12 to provide communication between the main portion and the subchambers. As it is necessary to provide a good seal between the coating chamber 12 and the subchambers 36, 44 to keep air out of the chamber and prevent combustion, the collars 106 are formed of a resilient material, and the annular collar portions 103 and the wall openings 108 into which they extend are tapered inward to insure an airtight seal. The subchambers 36 and 44 and the collar 106 are preferably interchangeable to accommodate tubing of substantially different diameters. The clearance provided by the passageway 105 of the collar 106 and inlet and outlet ports 34 and 42 is sufficient to prevent grounding of the chamber or arcing between the chamber and the tube and to allow clear passage of the tube.

To allow clear passage of the grounded tube 9, and a sufficient air gap to prevent arcing between the grounded tube and the chamber 12 allowing for some play in the tube, it is inherent that the entrance and exit ports 34 and 42 are not gas tight. While the clearance between the tube and the ports 34 and 42 possibly may allow some air to enter and some coating-laden gas to exit, the hazard caused thereby is minimized by providing sufficient flow of inert gas into the chamber 12 and a sufficient exchaust rate through the exhaust ports 58a and 58b on the sides of the subchambers 36 and 44 so that coating-laden gas from the chamber 12 and air from the ambient atmosphere which enter the subchambers are exhausted therefrom through the exhaust lines 114a and 114b. Despite the necessary clearance which allows some air to enter the chamber 12, the substantially closed chamber dramatically reduces the air which is withdrawn from the plant as compared with conventional spray painting booths. In one test application, the amount of air withdrawn from the plant was reduced from over 5000 cubic feet per minute to about 900 cubic feet per minute.

While coating material is efficiently used in electrostatic coating as the charged particles are electrostatically attracted to the object to be coated, a certain amount of overspray does occur, and the overspray particles collect on interior surfaces of the chamber 12. For more efficient use of coating, it is desirable to collect the overspray for reuse. Accordingly, a lower collection panel 120 (FIG. 3) is angled downward from the front wall 94 to the back wall 96 of the chamber 12 so that overspray coating collects at the back of the chamber and exits through a drainage opening 122 disposed generally at the level of the back of the collection panel 120. A short tube 126 made of insulating material locates in the drainage opening 122 of the back wall 96 and extends outward of the back wall 96 for attachment of tubing through which the overspray coating is returned to a coating tank.

A certain amount of the overspray coating will accumulate on surfaces of the chamber 12 above the tube 9, and when sufficient coating material accumulates above the tube 9, droplets will form which, if allowed to drip onto the tube 9, will result in an uneven and unattractive coating on the tube. Accordingly, the chamber should be designed to prevent dripping. Typically, an upper V-shaped baffle 130 (FIG. 5) is provided which angles downward from the upper center of the coater to the side walls 131. The angle of descent of the upper baffle 130 from the center to the side walls 131 is sufficiently great so that coating droplets which form thereon flow to the side walls 131 and down along the side walls instead of dripping onto the tube 9.

The coating material flowing down the front wall 94 is diverted away from the tube by a V-shaped drip shield 132a disposed above the collar 106 as best seen in FIG. 5. A pair of shield panels 134 extend inward of the front wall 94 and angle to meet at a common vertex 136 above the tube 9. A flange 138 extends upward from the inward edge of each shield panel 134 distal to the front wall 94 so the coating does not drip from the inward edge of the shield panel 134. A similar drip shield 132b on the back wall 96 diverts coating material flowing down the back wall 96 away from the tube 9.

Many coating solvents are highly volatile and highly flammable. In the presence of arcing or sparking, which is an ever present possibility in electrostatic coating despite the best efforts to eliminate arcing or sparking, an electrostatic coating application chamber 12 could, in the absence of precaution, be subject to explosion or fire. To substantially eliminate the possibility of explosion or fire, a combustibly inert atmosphere is maintained in the coating chamber 12. Plant nitrogen (nitrogen being one of the least expensive combustibly inert gases) is provided to the chamber 12 by a supply line 142 through the inlet 56. Preferably a diffuser in the form of an elongated pipe 144 with a plurality of spaced nozzles 145 is provided to diffuse the nitrogen entering the chamber 12 and create a uniform curtain of nitrogen which will not detrimentally affect the spray of coating material from the guns 50 to the tube 9. The nitrogen flow into the chamber 12 is sufficient to maintain a positive pressure within the chamber so that air entering the main portion 40 through the collar passageways 105 from the subchambers 36 and 44 is kept to a minimum.

Openings 150a and 150b (FIG. 8) are provided in the back wall 96 of the chamber 12 for insertion of the nozzles 152 of typical spray guns 50. As seen in FIG. 3 the upper spray gun 50a and the lower spray gun 50b are directed at the tube 9 at an angle of about 25°. The upper gun 50a, however, is located a greater vertical distance from or at a different angle to the tube 9 than the lower gun 50b so that the spray from the two guns do not meet and create turbulance at the tube. Additional guns may be directed at the sides of the tube 9 in chambers 12 which are used for coating larger diameter tube. Because electrostatic coating distributes particles generally evenly over a surface, a single gun may suffice for certain applications while more than two guns may be required for larger surface area products. Only the nozzles 152 of the guns 50 are inserted in the openings 150 to prevent any potential grounding of the chamber which would decrease the electrostatic potential. The nozzles 152 are sealed in openings 149 (FIG. 6) in the extra support layer 91 behind the back wall 96 of the chamber 12. An outer portion 151 of the nozzle openings 149 ia of a shape appropriate to receive the body of the guns 50. The inner portion 153 of the nozzle openings 149 ia generally cylindrical and has an annular groove 155 in which a sealing "0" ring of resilient Viton insulating material is located to form a airtight seal around the nozzle 152 while maintaining electrical isolation of the gun from the walls of the chamber 12.

The electrostatic coating applicators 50 may be spray guns of any type known in the art. Preferably, the guns are airless and atomize coating material without the use of air. If air-pressurized spray guns are used, the air used may have to be mixed with nitrogen or another inert gas so as not to create an explosive hazard. Centrifugal bell or disc units may also be used in place of the spray guns.

The guns 50, which carry charges upward of 60,000 volts to charge the coating particles, are individually powered. Due to the high charges on the guns 50, precautions are taken to eliminate electrical hazard to workers. The guns 50 are mounted from arms 160 (FIG. 4) of a spray gun post 52 which is mounted on the movable platform 14 on which the chamber 12 is mounted. Depending on the type of electrostatic applicator, the post and/or the arms are made of insulating material or include sections of insulating material to electrically isolate the guns from the platform.

A plurality of tanks 162 containing coating materials or solvent are positioned adjacent to the path of the tube 9 to supply various coatings to the spray guns 50 and solvents to wash the spraying system between the use of different coatings. Illustrated in FIG. 2 are three tanks 162a, 162b and 162c which may contain a solvent-based paint, an organic solvent for the solvent-based paint, and an ultraviolet or heat-cured coating material. A bulk coating reservoir 163 is connected by tubing 164 to the tank containing the most frequently used coating to replenish the supply in the tank. The tanks 162 are insulated from ground to prevent loss of electrostatic potential.

Line portions 172a–c are connected to a main line 173 leading to the pump 165 mounted on a pump stand 166. The tanks 162a–c are also connected to line portions 176a–c of a return line 174 leading from the outlet tube 126 to collect overspray from the chamber 12.

Appropriate valves on the line portions 172 and 176, leading from and into the tanks 162, open and close to control flow from and into the tanks so that the type of coating or cleaning solvent forced by the pump 165 through lines 169 to the spray guns 50 may be changed.

Mounted adjacent to the pump 165 on the pump platform 166 is a programmable control unit 168 which, in addition to its other functions, directs the opening and closing of the valves to switch from one coating material to another. The control unit 168 also directs the purging of the system with appropriate solvents between use of different coatings and the dumping of contaminated coating or solvent into a drainage trough 171 alongside the tube finishing line 10. Systems for changing from one coating material to another with appropriate purge cycles and dump cycles are known in the art. The purging of the system should include flushing the interior surfaces of the chamber 12 with an appropriate solvent. This may be accomplished in many cases merely by passing pressurized solvent through the coating applicators 50. Where the shape of the chamber 12 or the angle of the applicators 50 makes such flushing inefficient, additional flushing apparatus may be included in the chamber.

The primary function of the control unit 168 is to monitor the nitrogen flow system and timing functions to keep the oxygen level below combustion levels. Other functions performed by the control unit 168 include monitoring coating flow through the guns 50, and monitoring the exhaust flow to alarm an operator if improper flow is resulting from coating-clogged filters or air scrubbers. Furthermore the control unit 168 may actuate various pieces of apparatus on the finishing line 10 or direct various pieces of equipment, such as the curing units 70, to be rolled into or out of alignment with the line. The control unit 168 is of a type known in the art and may either be of conventional relay design or contain a microprocessor unit.

While the major portion of the overspray particles collects in the chamber 12 and is either purged and dumped or returned to the appropriate tank 162, some spray particles or aerosols will become suspended in the carrier gas, i.e., nitrogen. As it is necessary for workers' safety and to comply with governmental clean air regulations, the coating-laden gas may not be exhausted into the worker's environment, but it must be cleaned of coating particles and exhausted exterior of the workers' environment. Exhaust lines 114a and 114b leading from the gas exhaust ports 58a and 58b from the inlet subchamber 36 and outlet subchamber 44 conduct the carrier gas from the chamber 12. Coating-laden gas is exhausted from the subchambers 36 and 44 rather than from the main portion 40 of the chamber 12 because, as previously noted, air may enter through the inlet port 34 and outlet port 42 possibly causing the oxygen level in the main portion to exceed the safe level.

Having the exhaust ports 58a and 58b extending from the subchambers 36 and 44 results in most of the air, which does enter the port, being pulled, along with coating-laden gas, from the chamber 12 through the exhaust system rather than entering the main portion 40 of the chamber. The gas, which is pulled through the exhaust lines 114, continues through the filtering chamber 62. An exhaust fan 190, which is driven by a motor 192, sucks the gas through the exhaust system 60.

The rate of exhaust provided by the fan 190 is preferably matched to the rate of nitrogen flow into the coating chamber 12. The exhaust rate should not be so high that significant amounts of air are pulled into the subchambers 36 and 44 so as to result in air seepage into the chamber 12 and a resulting high oxygen concentration in the exhaust system 60 which could result in an explosive situation. On the other hand, the exhaust flow should be at sufficiently high rate so that significant amounts of coating-laden gas are not vented into the plant atmosphere. Since the exhaust flow rate changes as the filter 194 becomes saturated with coating particles, appropriate flow meters and control means may be provided in the exhaust system to indicate the need to change the filters.

While the atmosphere in the coating chamber 12 is primarily inert nitrogen, air entering inlet and outlet ports 34, 42 necessarily mixes with the carrier nitrogen in the exhaust system 60. While air admixture may be minimized by appropriately sizing the ports 34, 42, precautions are taken to eliminate arcing or sparking within the exhaust system 60. The exhaust lines 114a and 114b from the subchambers 36 and 44 to the filter chamber 62 are made of insulating material to electrically isolate the coating chamber 12 from the exhaust system 60. The filter chamber 62 mounted so as to be electrically isolated from the motor-fan assembly 196 and is formed of insulating material such as polypropylene. As seen in FIG. 1, the filter chamber 62 and motor-fan assembly 196 are mounted on an elevated platform by insulating standoffs 200 and 202. A connecting duct 204 between the motor-fan assembly 196 and the filter chamber 62 is formed of electrically insulating material to maintain the electrical isolation between the filter chamber and the motor-fan assembly 196.

The filter chamber 62 in which coating particles are removed from the coating-laden exhaust gas has an enlarged cross-sectional area in a plane orthangonal to the gas flow direction to accommodate a large filter 194 disposed therein. The filter 194 extends substantially to the walls of the filter chamber 62 so that substantially all of the gas flow passes through and is cleaned by the filter.

A front section 210 of the filter chamber 62 is connected to a back section 212 by hinges 214 on the upper side of the filter chamber 62 so that the front member 210 may be swung upward from the back section 212 for removal and replacement of the filter 194. A plurality of latches 215 on the sides and bottom of the filter chamber 62 hold the front section 210 to the back section 212 so that sealing means on the rims of the sections form a gas tight seal therebetween.

A center segment 216 of the chamber 62 which includes portions of the front and back sections 210 and 212 on either side of the hinges 214 has a uniform rectangular cross-section. An inlet segment 218 of the front section 210 distal to the hinge 214 has a pyramid shape so that the cross-sectional area expands from a front inlet panel 224 to the center segment 216. Similarly, an outlet segment 230 of the back section 212 of the filter chamber 62 tapers from the center segment 216 to join with the narrower connecting duct 204 leading into the motor-fan 196 assembly.

The fan 190 which is disposed toward the front of a large gas chamber 232 pulls the now-filtered exhaust gas therebehind into the gas chamber from where it exits upward through an exhaust duct 234 leading externally of the plant. The motor 192 which drives the fan 190 is of a spark-proof design for explosion prevention purposes.

Several advantageous features of the invention may now be more fully appreciated. The invention provides apparatus by which an elongated object may be electrostatically coated with organic solvent-based coating material and which substantially eliminates the inherent associated hazards. The dangers of electrical shock are minimized by electrically isolating each component of apparatus, which contacts the coating material, from ground. The explosive danger of using volatile solvents in the presence of potential spark generating equipment is eliminated by providing a blanket of inert nitrogen for the coating operation and with provisions such as airless spray guns, for keeping air out of the system. The enclosed coating spraying apparatus protects workers from contaminated air while the exhaust system returns filtered exhaust gas to the atmosphere.

The apparatus herein provided, furthermore, permits the uniform spraying of an elongated object. The nitrogen carrier gas enters the chamber through a diffuser so that the carrier gas flow does not adversely affect the spray of coating material from the gun. The system of baffles reduces problems associated with coating material accumulation on the walls of the chamber by allowing accumulated coating to flow to the bottom of the chamber without dripping on the object.

The apparatus provides for efficient use of coating material by collecting and recycling overspray. The automated purging and dumping system for changing from one coating to another promotes efficiency of operation. The enclosed chamber with low exit rates provides for an energy efficient system by reducing the air withdrawn from a plant.

While the invention has been described in terms of a preferred embodiment, modifications obvious to one skilled in the art may be made without departing from the scope of the invention. It is to be understood, for example, that the described shape of the chamber and the described angle at which the coating is applied is an arrangement that the inventors have found particularly suitable for coating products such as fence or mechanical tubing. The coating application chamber may be of any geometric shape and the coating applicators may be placed in any plane therein to accommodate the specific elongated material being coated. Air scrubbers may be used in place of filters in the exhaust system.

Various features of the invention are set forth in the following claims.

What is claimed:

1. Apparatus for electrostatically coating, with liquid coatings including organic solvent-based coatings, an electrically grounded, elongated object of indefinite length moving along a straight-line path, said apparatus comprising;

a substantially closed chamber having an inlet port through which the elongated object enters said chamber, an outlet port through which the elongated object exits said chamber, and means electrically insulating said chamber from ground;

a coating supply system;

electrostatic coating applicator means to atomize and charge said supplied coating material;

mounting means to direct said applicator means at a portion of the elongated object within said chamber;

means electrically isolating said applicator means from said chamber to prevent charging of said chamber;

means for providing combustibly inert carrier gas to said chamber; and exhaust means for removing coating-laden carrier gas from said chamber, said inert-gas-providing-means and said exhaust means maintaining a non-combustible atmosphere within said chamber.

2. Apparatus according to claim 1 wherein said exhaust means includes filter means to remove coating material particles from said coating-laden gas.

3. Apparatus according to claim 1 wherein said applicator means is an electrostatic airless spray gun.

4. Apparatus according to claim 1 wherein said exhaust means is electrically isolated from said chamber.

5. Apparatus according to claim 1 wherein said exhaust means is electrically insulated from ground.

6. Apparatus according to claim 1 wherein said applicator means is disposed exterior of said chamber, and said chamber has an opening wherethrough a nozzle of said applicator means is inserted.

7. Apparatus according to claim 1 wherein said chamber includes coating material recovery means to collect overspray coating material and direct the collected coating material from said chamber for reuse.

8. Apparatus according to claim 1 wherein said chamber includes baffle means to prevent overspray coating which collects on interior surfaces of said chamber upward of the object from dripping onto the object.

9. Apparatus according to claim 8 wherein said baffle means comprises;

an upper panel, disposed above the elongated object passing through said chamber, which angles downward toward a wall of said chamber so that drops of overspray coating, forming on said panel, flow to said wall and down said wall; and drip shields disposed above said tube to divert coating material running down the walls of said chambers, through which the tube passes, away from the tube.

10. Apparatus according to claim 1 further comprising:

a plurality of tanks containing a plurality of coating materials and solvents for said coating materials;

means for selecting a coating material and supplying said selected coating material to said applicator means; and means for purging said apparatus with a solvent appropriate for said selected coating material after a further coating material is selected but before said further coating material is supplied to said applicator means.

11. Apparatus according to claim 1 wherein said applicator means is an electrostatic air-pressurized spray gun.

12. Apparatus according to claim 1 wherein said applicator means is an electrostatic centrifugal coating unit.

13. Apparatus according to claim 1 including means to flush surfaces of said chamber with an appropriate solvent subsequent to a coating operation.

* * * * *

UNITED STATES PATENT AND TRADEMARK OFFICE
CERTIFICATE OF CORRECTION

PATENT NO. : 4,344,381
DATED : August 17, 1982
INVENTOR(S) : Arthur E. Ostrowski and Joseph M. Polich It is certified that error appears in the above—identified patent and that said Letters Patent is hereby corrected as shown below:

Column 6, line 43, change (FIG. 8) to --FIG. 3)--;

Column 6, line 64, change "ia" to --is--.

Column 11, line 4, change "tube" to --elongated object--,

Column 11, line 6, change "tube" (both occurrences) to --elongated object--.

Signed and Sealed this

Tenth Day of May 1983

[SEAL]

Attest:

GERALD J. MOSSINGHOFF

Attesting Officer

Commissioner of Patents and Trademarks